United States Patent
Ueltschey, III et al.

(10) Patent No.: US 8,490,116 B2
(45) Date of Patent: Jul. 16, 2013

(54) EMULATING LEGACY VIDEO USING UEFI

(75) Inventors: Charles Marion Ueltschey, III, Beaverton, OR (US); Timothy Andrew Lewis, El Dorado Hills, CA (US)

(73) Assignee: Phoenix Technologies Ltd., Milpitas, CA (US)

(*) Notice: Subject to any disclaimer, the term of this patent is extended or adjusted under 35 U.S.C. 154(b) by 185 days.

(21) Appl. No.: 13/190,343

(22) Filed: Jul. 25, 2011

(65) Prior Publication Data

US 2012/0159520 A1 Jun. 21, 2012

Related U.S. Application Data

(60) Provisional application No. 61/424,396, filed on Dec. 17, 2010.

(51) Int. Cl.
*G06F 3/00* (2006.01)
(52) U.S. Cl.
USPC .......................................................... 719/323
(58) Field of Classification Search
USPC .......................................................... 719/323
See application file for complete search history.

(56) References Cited

U.S. PATENT DOCUMENTS

| | | | | |
|---|---|---|---|---|
| 5,581,766 A * | 12/1996 | Spurlock | ............................ | 713/2 |
| 7,007,159 B2 * | 2/2006 | Wyatt | ................................. | 713/1 |
| 7,987,348 B2 * | 7/2011 | Swanson et al. | ................... | 713/1 |
| 8,255,594 B2 * | 8/2012 | De et al. | ........................... | 710/33 |
| 2012/0117302 A1 * | 5/2012 | Wang et al. | .................... | 711/102 |

* cited by examiner

*Primary Examiner* — Emerson Puente
*Assistant Examiner* — Charlie Sun
(74) *Attorney, Agent, or Firm* — Christopher J. Brokaw; Brokaw Patent Law PC

(57) ABSTRACT

Techniques for supporting legacy VGA video using UEFI standard and extended UEFI graphics drivers. When an operating system that does not natively support the UEFI display protocols requires video services provided by firmware, the operating system communicates a request for video services to a generic video option ROM. The generic video option ROM notifies a generic video SMM driver of the request for video services. Such notification may be performed using a software system management interrupt (SMI). Upon notification, the generic video SMM driver notifies a third party UEFI video driver of the request for video services. The third party video driver provides the requested video services to the operating system. In this way, a third party UEFI graphics driver may support a wide variety of operating systems, even those that do not natively support the UEFI display protocols.

21 Claims, 7 Drawing Sheets

EMULATING LEGACY VIDEO USING UEFI

CLAIM OF PRIORITY

The present application claims priority to U.S. provisional application 61/424,396, entitled, "Emulation of Legacy Video Using UEFI Graphics Output Protocol, filed Dec. 17, 2010, by Chip Ueltschey et al., which is hereby incorporated by reference for all purposes as if fully set forth herein.

FIELD OF THE INVENTION

The present invention relates to approaches for supporting legacy VGA video interfaces using the facilities provided by standard and extended UEFI graphics drivers.

BACKGROUND OF THE INVENTION

Today there are two major approaches for booting a PC. The first approach (the "legacy approach") originated with IBM in the 1980s, while a more modern approach (the "EFI/UEFI approach") was initially developed by Intel Corporation in 1999 and was later enhanced by others. These two approaches are not necessary compatible as these standards use a different model to launch the operating system and initialize hardware resources.

Operating systems are generally designed to be booted using either the legacy approach or the EFI/UEFI approach for booting. Typically, older operating systems ("legacy operating systems") expect to be booted using the legacy approach and do not support being booted using the EFI/UEFI approach. On the other hand, newer operating systems ("UEFI operating systems") typically expect to be booted using the EFI/UEFI approach and do not support being booted using the legacy approach. This presents a challenge for firmware manufacturers as firmware needs to support not only newer operating systems which generally expect to be booted using the EFI/UEFI approach, but also older operating systems which generally expect to be booted using the legacy approach.

Certain optional or peripheral devices may be coupled or plugged into a PC to provide additional capabilities to the PC. Some less-complex peripheral devices (such as a mouse or keyboard) may be directly supported by the firmware. However, more complex devices, such as a network card or video card, may be supported by executable code, provided by the manufacturer of the device, which may be called or referenced by the firmware.

With respect to video cards, there are generally two approaches for making the executable code provided by the manufacturer of the video card accessible to the firmware of the PC. According to a first approach, a third party option ROM and a third party UEFI video driver are used to support the two classes of operating systems (legacy operating systems and UEFI operating systems). In a second approach, a third party option ROM is provided and a generic UEFI Video Driver uses the real mode services provided by the option ROM to create an instance of the UEFI Graphics Output protocol.

Both of these approaches for supporting legacy video suffer from disadvantages. The first approach is slow, especially on systems which must boot legacy and UEFI operating systems, since, in the course of booting, the system firmware may have to load first the option ROM and then load the UEFI driver, perhaps more than once. The first approach is also larger in size than is desirable, as each of the two drivers contain roughly the same level of executable code, and, in many cases, must be placed inside of non-volatile storage (flash, EEPROM, etc.) on a plug-in card or on the system motherboard. In either case, this could cause the cost of the product to rise. Another disadvantage to the first approach is that it is difficult to maintain, as bug fixes and feature updates must be made in both the option ROM and the UEFI driver.

The second approach for making manufacturer-provided executable code available to the firmware also exhibits problems with size and speed. The option ROM is run in 16-bit real mode, which is a slower and more constrained mode of x86 CPUs. The UEFI driver is run in either 32-bit or 64-bit protected mode, which is a faster mode, but efficient access to the graphics frame buffer used for high-performance graphics is not possible. Also, the option ROMs can only execute in a relatively small area of memory (roughly from 768K to 1 MB). Finally, as system firmware makes the transition to UEFI, the number of third party vendors who will either produce or optimize for performance their option ROMs will dwindle over time.

Discussion in this section is meant to provide an understanding of prior approaches to the reader as they relate to embodiments of the invention. However, the disadvantages of prior approaches discussed in this section are not meant to be an admission that such disadvantages were publicly known. Consequently, recognition of the disadvantages of the prior art discussed herein is not meant to be construed as being within the prior art simply by virtue of its inclusion in this section alone.

SUMMARY OF THE INVENTION

Embodiments of the invention use the graphics frame buffer provided by the UEFI graphics driver to emulate both legacy text and video modes. Attempts to access legacy video services provided by the UEFI graphics driver are translated by a generic video option ROM into software SMI service calls made to a generic SMM video driver. The generic SMM video driver uses information previously gathered from the UEFI video driver to emulate the call to the UEFI graphics driver. In some cases, embodiments also provide emulation for the hardware text buffer or direct access to a portion of the graphics device's frame buffer.

The approaches described herein are not meant to describe all the embodiments of the invention, as other embodiments of the invention may differ in their operation compared to the illustrative approaches discussed in this section.

BRIEF DESCRIPTION OF THE DRAWINGS

Embodiments of the invention are illustrated by way of example, and not by way of limitation, in the figures of the accompanying drawings and in which like reference numerals refer to similar elements and in which.

DETAILED DESCRIPTION OF THE INVENTION

Approaches for supporting the video requirements of older operating systems using the facilities provided by a third party UEFI video driver are described. In the following description, for the purposes of explanation, numerous specific details are set forth in order to provide a thorough understanding of the embodiments of the invention presented herein. It will be apparent, however, that the embodiments of the invention presented herein may be practiced without these specific details. In other instances, well-known structures and devices are shown in block diagram form in order to avoid unnecessarily obscuring the embodiments of the invention presented herein.

Functional Overview

Figure 1:
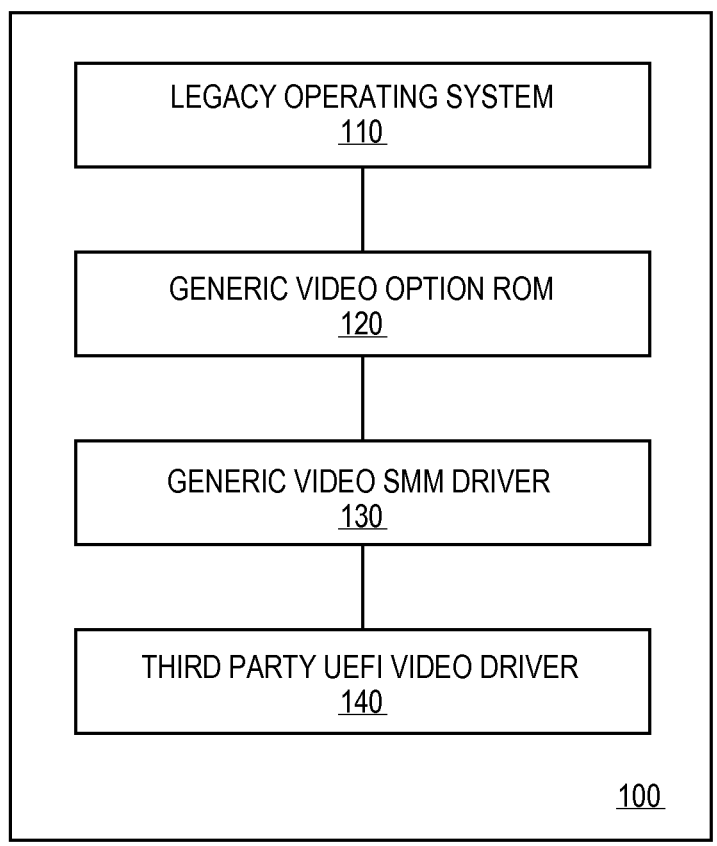
FIG. 1 is a high-level block diagram of an embodiment of the invention.

Embodiments of the invention enable a third party UEFI video driver to support the video requirements of older operating systems. FIG. 1 is a high-level block diagram of a computer system 100 according to an embodiment of the invention. As shown in FIG. 1, computer system 100 includes a legacy operating system 110, a generic video option ROM 120, a generic video SMM driver 130, and a third party UEFI video driver 140. Computer system 100 may correspond to any machine which is capable of executing firmware and an operating system, such as without limitation: a portable device (e.g., a laptop, a tablet computer, a personal digital assistant (PDA), or a cell phone), a game system (such as an Xbox available from Microsoft Corporation of Redmond, Wash. or a Playstation 3 available from Sony Corporation of Park Ridge, N.J.), and a personal computer (PC).

Legacy operating system 110 broadly refers to any operating system which does not natively support being booted using a UEFI driver. A UEFI driver is a driver that conforms to the Unified Extensible Firmware Interface specification developed by the Unified EFI Forum. Generic video option ROM 120 broadly refers to any type of standard option ROM that stores the video BIOS. Generic video SMM driver 130 broadly refers to any type of driver for processing video system management interrupt (SMI) requests. Third party UEFI video driver 140 broadly refers to an UEFI option ROM that conforms to the UEFI specification.

One challenge in the art is that legacy firmware services are called in a very restricting operating mode called real mode. Unfortunately, real mode has a number of limitations. For example, in real mode, it is not possible to access more than 1 megabyte of memory. However, all modern video devices no longer have video registers accessible below 1 megabyte address space.

Embodiments of the invention overcome this limitation by using the graphics frame buffer provided by the third party UEFI video driver 140 to emulate legacy firmware services, such as legacy text and video modes. Attempts by legacy operating system 110 to access legacy video services are translated by generic video option ROM 120 into software SMI service calls to generic video SMM driver 130. Generic video option ROM 120 may communicate with generic video SMM driver 130 by issuing a system management interrupt (SMI), which is trapped and handled by generic video SMM driver 130.

Generic video SMM driver 130 may enter system management mode (SMM), a mode which provides access to more than 1 megabyte of memory, thereby allowing generic video SMM driver 130 to access the video registers of modern video devices. Generic video SMM driver 130 then uses the information previously gathered from the third party UEFI video driver 140 to emulate the requested legacy video service. In some embodiments, embodiments also provide emulation for the hardware text buffer or direct access to a portion of the graphics device's frame buffer.

Figure 2:
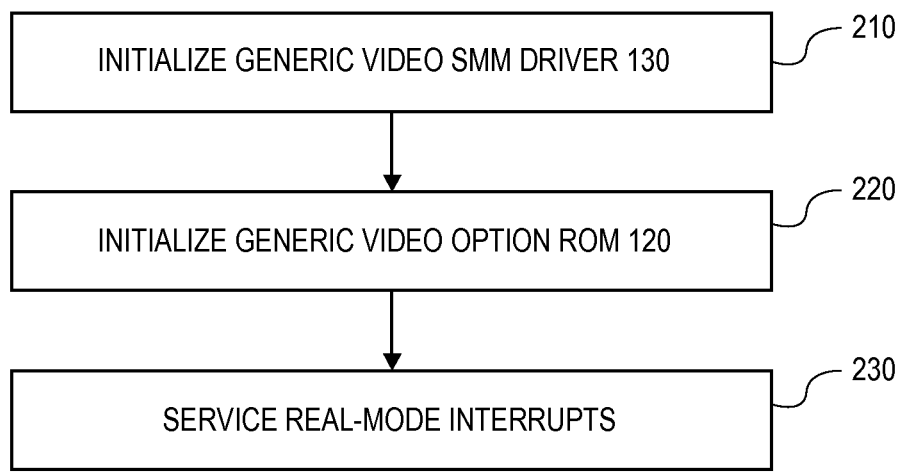
FIG. 2 is a flowchart illustrating the steps of a third party UEFI video driver to support the video requirements of legacy operating systems according to an embodiment of the invention.

FIG. 2 is a flowchart illustrating the steps of a third party UEFI video driver to support the video requirements of legacy operating systems according to an embodiment of the invention. As shown in FIG. 2, the operation of certain embodiments of the invention involves three steps, namely the initialization of the generic video SMM driver 130, the initialization of the generic video option ROM 120, and the servicing of real-mode interrupts. Each of these steps shall be discussed in further detail below.

Generic Video SMM Driver Initialization

Step 210 of FIG. 2 depicts the first step performed for a third party UEFI video driver to support the video requirements of legacy operating systems according to an embodiment of the invention. In step 210 of FIG. 2, generic video SMM driver 130 is initialized. Generic video SMM driver 130 acts as the intermediary between generic video option ROM 120 and third party UEFI video driver 140.

Figure 3:
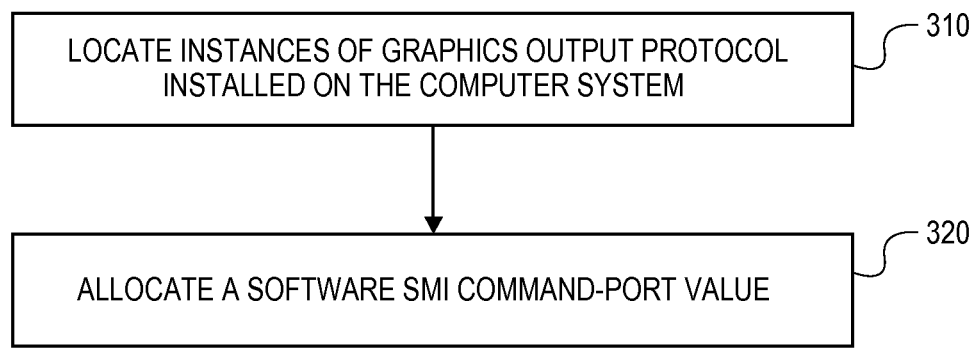
FIG. 3 is a flowchart illustrating the steps of initializing generic video SMM driver 130 according to an embodiment of the invention.

In one embodiment, the initialization of generic video SMM driver 130 accomplished in step 210 may be performed according to the steps depicted in the flowchart of FIG. 3. In step 310, the instances of the graphics output protocol that are installed on computer system 100 are located. The information associated with located instances of the graphics output protocol is compared with platform-specific information indicating the desired primary video output device.

One way to perform step 310 would be to compare the device path installed on the handle associated with the instance of the graphics output protocol with a previously confirmed device path. Once the comparison is successful, information about the current graphics mode and the frame buffer for this device is saved. The virtual video mode may then be set to the largest VESA-defined VGA mode having dimensions less than or equal to the current virtual video mode which supports frame buffer access. The current virtual video font and the virtual text screen information (e.g., rows and columns) may be adjusted accordingly. Thereafter, the BIOS Data Area can be initialized to contain the current mode information.

In step 320, a software system management interrupt (SMI) command-port value is allocated. The software command-port value is written to using an I/O write instruction to the SMI command-port. This software SMI value is used to initiate communication between generic video option ROM 120 and generic video SMM driver 130.

The software SMI interface is necessary because the generic video option ROM 120 cannot access the frame buffer of most video devices. The limitation is a result of frame buffers being located anywhere in the 32-bit or 64-bit address space provided by the PCI/PCI Express bus, while the CPU can only access an approximately 20-bit address space when operating in the real-mode environment available to option ROMs in prior approaches. By using the software SMI interface, generic video option ROM 120 transfers the responsibility for fulfilling the services to generic video SMM driver 130, which operates in the CPU's 32-bit or 64-bit addressing environments.

Generic Video Option ROM Initialization

Step 220 of FIG. 2 depicts the second step of an embodiment for a third party UEFI video driver to support the video requirements of legacy operating systems. In step 220, generic video option ROM 120 is initialized. Generic video option ROM 120 acts as a standard PC/AT option ROM that acts as an intermediary between the legacy operating system 110 and generic video SMM driver 130. In an embodiment, generic video option ROM 120 only loads if there is an attempt to boot a legacy operating system and there is no video option ROM specifically designated for computer system 100. Initialization of generic video option ROM 120 happens as described in the PCI specification, where the option ROM is loaded into the reserved area between 768 KB and 1 MB on a 2 KB boundary and then its initialization entry point (at offset 3) is called in the CPU's real-mode execution environment.

Figure 4:
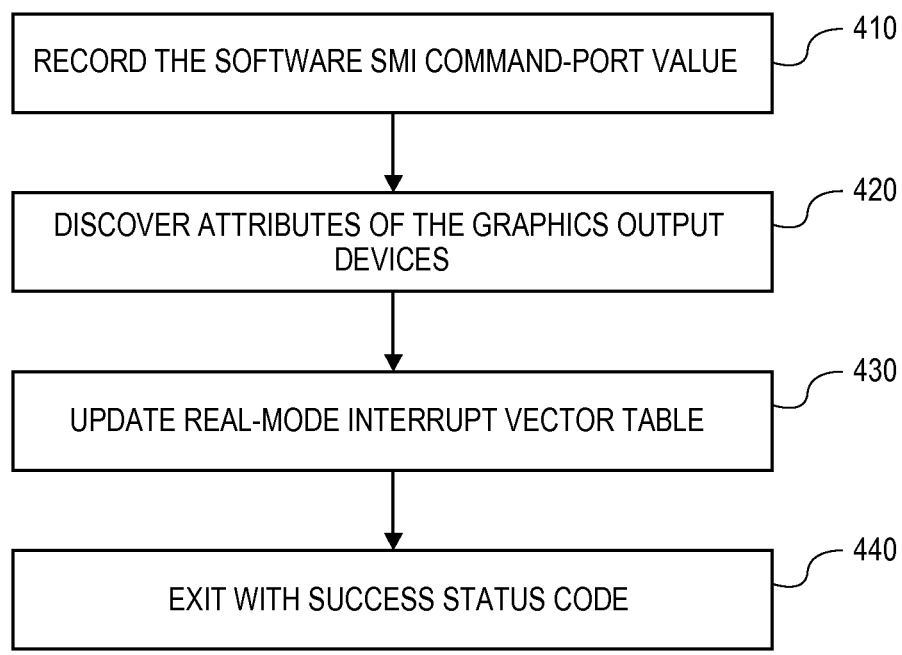
FIG. 4 is a flowchart illustrating the steps of initializing a generic video option ROM according to an embodiment of the invention.

In an embodiment, initialization of generic video option ROM 120 may be performed according to the steps illustrated in the flowchart of FIG. 4. In step 410 of FIG. 4, the software SMI command-port value allocated by generic video SMM driver 130 during its initialization (step 320) is determined and recorded. This may be performed by searching the ACPI table that contains both the command-port and the allocated command-port value.

In step 420, the attributes of the smallest of the graphics output devices, in pixels, is obtained. In an embodiment, step 420 may be performed using the software SMI GetCurrentVideoMode and GetModelInformation functions. If no attribute information is available, then generic video option ROM 120 will exit with an error. The information about the video mode size is used for further initialization, such as calculating which text and graphics mode generic video option ROM 120 will emulate.

In step 430, a pointer to the INT 10 handler in the real-mode interrupt vector table (physical address 0x40) is installed. The INT 10 handler will invoke the software SMI services using the software SMI interface (described in more detail below).

Finally, in step 440, the generic video option ROM 120 exits with a success status code. Generic video option ROM 120 emulates all other video modes by drawing the contents of those video modes centered on each of the graphics devices. Video modes which are larger than the virtual video mode return an error.

Servicing Real-Mode Interrupts

Step 230 of FIG. 2 depicts the third step of an embodiment for a third party UEFI video driver to support the video requirements of legacy operating systems. In step 230 of FIG. 2, real-mode interrupts are serviced. Generic video option ROM 120 provides software-generated interrupts (SMIs) to provide services for legacy operating systems through the well-known 17$^{th}$ (10 h) real-mode interrupt vector. The special handing of these services for legacy operating systems are described in further detail below in the section entitled INT 10H interrupts. In embodiments, generic video option ROM 120 may not itself perform any handling of the video services for legacy operating systems. In other embodiments of the invention, generic video option ROM 120 may perform parameter error checking.

In an embodiment, all real-mode interrupt services are translated by generic video option ROM 120 into software SMIs using the Int10Service call, which is described below in more detail in the section entitled "Software SMI Interface." The INT 10 interrupt services may be organized into four categories, namely text functions, graphic functions, font functions, and mode functions. Each of these categories of services will be discussed in greater detail below.

Text Functions

Figure 5A:
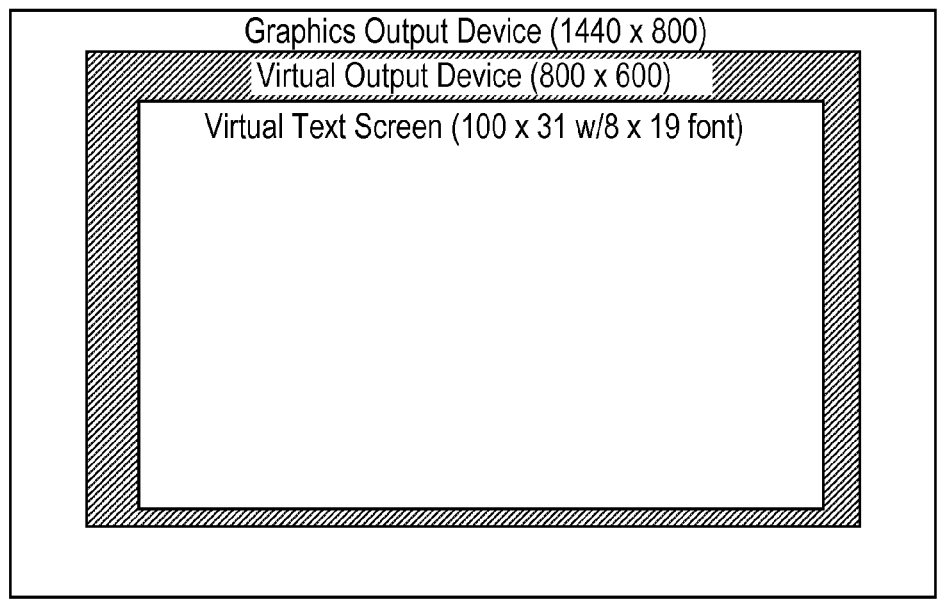
FIG. 5A depicts a virtual text screen of an embodiment of the invention.

INT 10 interrupt services may be used to perform text functions. Text functions may operate in both text and graphics modes. FIG. 5A depicts a virtual text screen of an embodiment of the invention. The virtual text screen consists of rows and columns of ASCII font characters with their corresponding foreground and background colors. The virtual text screen is centered in the virtual output device which, in turn, is centered on each of the graphics output devices. The virtual text screen can never be larger than 255 by 255 characters.

In an embodiment, generic video SMM driver 130 maintains a visible text cursor at the current cursor location, specified in terms of rows and columns. The size of the cursor is determined by the current font size and the value set by INT 0x10 (AH=0x01). The cursor can be rendered invisible by moving the cursor past the visible bounds of the screen.

Generic video SMM driver 130 may maintain up to 8 virtual text screens (called "pages") and may update text either on the current page or on one of the hidden page in an embodiment. Generic video SMM driver 130 may change which page is visible. When making a hidden page visible, the entire screen may be redrawn.

Generic video SMM driver 130 optimizes drawing by only redrawing characters that are updated on the current page in an embodiment. In an embodiment, generic video SMM driver 130 always treats the upper bit of a character's attribute as intensity rather than blink.

Functions that fall into this category include Set Cursor Shape (AH=0x01), Set Cursor Position (AH=0x02), Get cursor Position (AH=0x03), Set Active Display Page (AH=0x05), Scroll Up (AH=0x06), Scroll Down (AH=0x07), Read Character/Attribute (AH=0x08), Write Character/Attribute 9AH=0x09), Write Character (AH=0x0A), and Write String (AH=0x13).

Graphics Functions

INT 10 interrupt services may also be used to implement graphics functions. In an embodiment, graphics functions permit access to the virtual frame buffer. Accessing the virtual frame buffer may be used to read and write individual pixels as well as control the palette in certain VGA modes. Generic video SMM driver 130 may also be used to publish the addresses of the virtual frame buffer and the number of the bytes per scan-line as part of the mode information (elaborated below in the section entitled Mode Functions). The virtual frame buffer is actually a proper subset of the graphics device frame buffer. Generic video SMM driver 130 may only publishes support for the video modes that support frame buffers.

For each of the EGA/VGA modes (graphics mode with numbers less than 0x14), Generic video SMM driver 130 maintains a current palette which assists in translating pixel colors specified by the INT 0x10 services into 24-bit color values used by the frame buffer. Generic video SMM driver 130 also maintains a single color value for the portion of the virtual output device frame buffer that is not part of the virtual text screen (called the overscan).

If a user changes the palette using the various Palette functions, then the entire virtual output device frame buffer will be transformed using the updated palette registers. This permits the sorts of animations used by legacy applications.

Functions that fall into the graphics function category include Write Pixel (AH=0x0d), Read Pixel (AH=0x0e) and the various palette functions (AH=0x11).

Font Functions

Fur the current mode, generic video SMM driver 130 maintains a 256 character font of a height and width. During mode initialization, one of the built-in fonts is copied into the current fonts. The font functions permit modification of the current font bitmaps. When the size of the font is changed, the number of text rows and columns is recalculated and the entire screen is redrawn, including the overscan.

The built-in fonts are 8×19 pixels, 8×14 pixels, 8×8 pixels, 8×16 pixels, 9×14 pixels, and 9×16 pixels. The real-mode interrupt vector 0x1F (address 0x7C) points to the second half of the 8×8 font. The real-mode interrupt 0x43 (address 0x10C) points to the first half of the font, whatever the size.

Functions that fall into this category include various font functions (AH=0x11).

Mode Functions

Figure 5B:
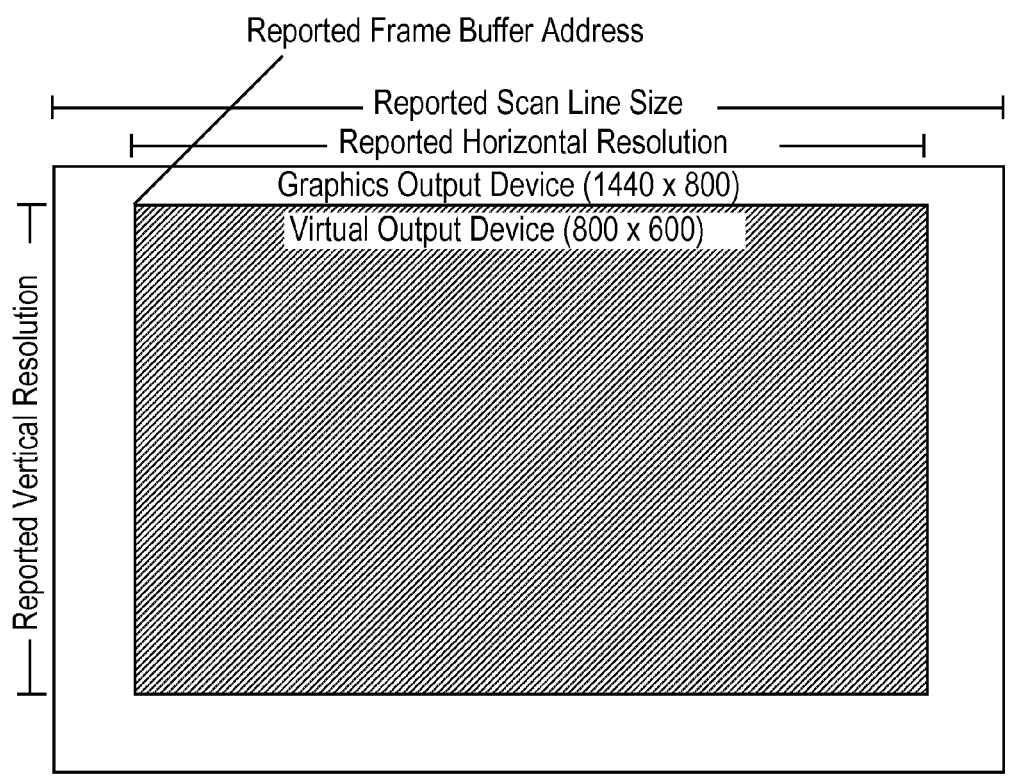
FIG. 5B depicts information maintained by generic video SMM driver about the current virtual mode according to an embodiment.

In an embodiment, generic video SMM driver 130 maintains a current virtual mode. FIG. 5B depicts information maintained by generic video SMM driver 130 about the current virtual mode according to an embodiment. Generic video SMM driver 130 supports all the standard VGA modes, as well as those video modes that are compatible with the current virtual video mode and which support 24-bit or 32-bit frame buffer access. In general, these include VESA text modes 0x108-0x10C and VESA graphics modes 0x10F, 0x112, 0x115, 0x118 and 0x11b. Generic video SMM driver 130 also maintains information about each of the video modes, such as resolution and color depth. The frame buffer information for these functions is adjusted to point to the actual sub-set of the frame buffer used by the virtual video mode, with the scan-line information updated to indicate the actual frame buffer width.

Functions that fall into this category are Set Video Mode (AH=0x00), Get Video Mode (0x0f), and the various VESA mode reporting functions (AH=4fh).

Software SMI Interface

In an embodiment, the software SMI interface consists of writing to the software SMI command-port with the software SMI command-port vale. The value in the AH register indicates the sub-function.

To illustrate, consider the following sub-functions and their corresponding value in the AH register:

Sub-function 0x00—Initialize
  Entry Parameters
  AH=0x00
  Ss:s0—Pointer to structure that holds the returned virtual video mode.
Sub-function 0x10—INT 10 Emulation
  Emulate an INT 10 call.
  Entry Parameters
  AH=0x10
  Ss:sp—Pointer to register structure that contains all of the 32-bit general purpose registers, all of the segment registers and the extended flags register.

```
Typedef struct __INT_10_REGISTERS {
    UINT32 EAX;
    UINT32 EBX;
    UINT32 ECX;
    UINT32 EDX;
    UINT32 ESI;
    UINT32 EDI;
    UINT32 EBP;
    UINT32 ESP;
    UINT32 EFLAGS;
    UINT32 DS;
    UINT32 ES;
    UINT32 CS;
    UINT32 SS;
    UINT32 FS;
    UINT32 GS;
    UINT32 ;
} INT_10_REGISTERS, *PINT_10_REGISTERS;
```

Parameters
  Ss:sp—Pointer to updated register structure.
  Table 1 below summarizes the industry standard INT 0x10 sub-functions for VGA devices. Table 1 is not intended to be a complete description.

TABLE 1

INT 0x10 Interrupts

| Function Value | Description |
| --- | --- |
| AH = 0x00 | Set Video Mode |
| AH = 0x01 | Set Cursor Shape |
| AH = 0x02 | Set Cursor Position |
| AH = 0x03 | Get Cursor Position |
| AH = 0x05 | Set Active Display Page |
| AH = 0x06 | Scroll Up |
| AH = 0x07 | Scroll Down |
| AH = 0x08 | Read Character/Attribute |
| AH = 0x09 | Write Character/Attribute |
| AH = 0x0a | Write Character |
| AH = 0x0b | Set Palette |
| AH = 0x0d | Write Pixel |
| AH = 0x0e | Read Pixel |
| AH = 0x0f | Get Video Mode |
| AH = 0x10 | Palette |
| AH = 0x11 | Set Font |
| AH = 0x13 | Write String |
| AH = 0x4f | VESA |

VGA Frame Buffer Support

In certain embodiments, an application may manipulate the VGA's graphic buffer directly for graphics mode<0x14. These VGA graphics modes use the memory region from 640 KB-768 KB to provide direct access to the pixel contents. An alternate embodiment of the invention uses hardware support.

Figure 6:
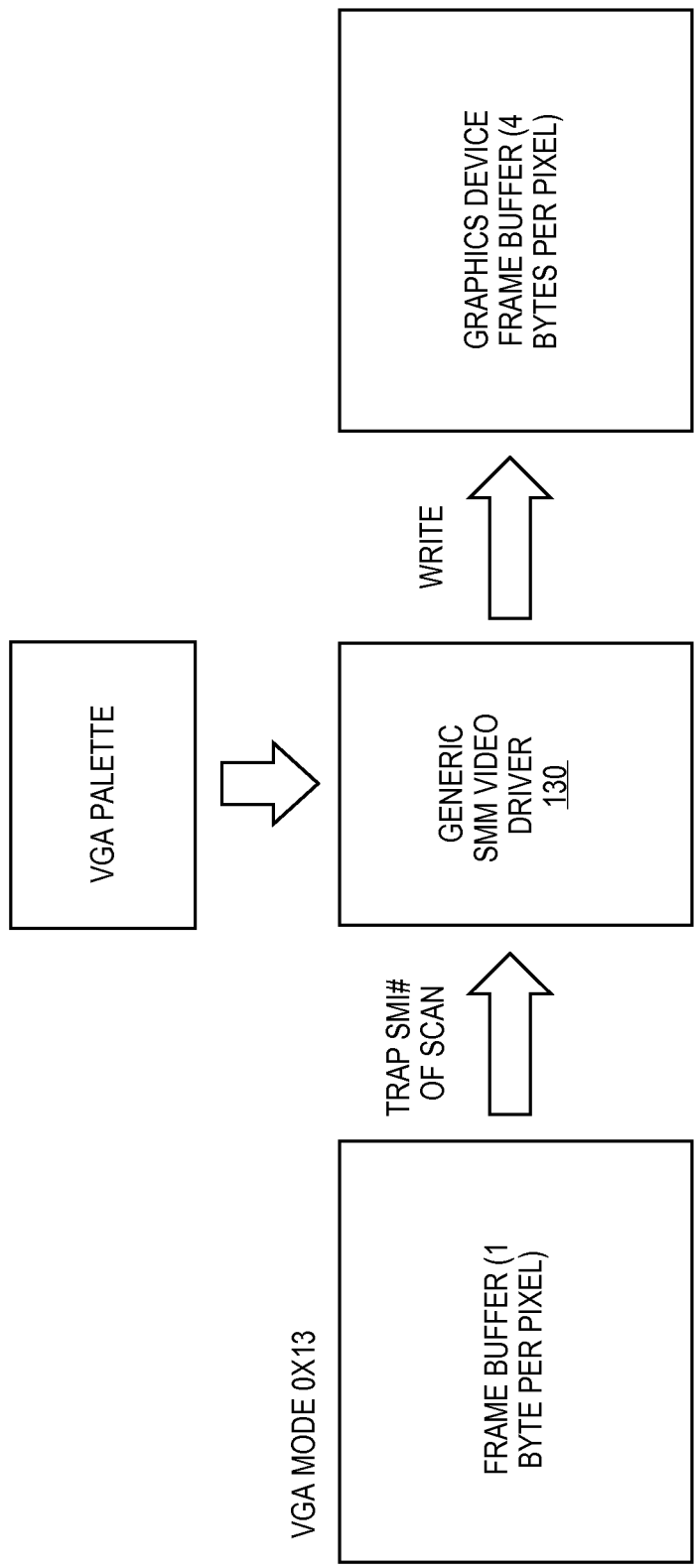
FIG. 6 is a block diagram of an alternate embodiment of the invention.

FIG. 6 is a block diagram of an alternate embodiment of the invention. As depicted in FIG. 6, when SMI trapping is available, but the hardware is capable of generating an SMI with each read or write access by the CPU, generic video SMM driver 130 may use the trap address to calculate the exact pixel that would have been updated in the current emulated VGA mode and may make the corresponding update to the graphic device's actual frame buffer. When SMI trapping is not available, but read/write access to normal RAM can be enabled for the memory region, a periodic SMI call may be used to scan for changes in the portions of the memory region that corresponds to the VGA graphics buffers and then updates the graphics device's actual frame buffer. In both cases, when a change is detected, the pixel is drawn on the virtual graphics device frame buffer.

Text Buffer Support

In certain embodiments, applications may manipulate the VGA's text buffer directly. In such an embodiment, generic video SMM driver 130 support this in one of two ways, depending on whether the hardware provides SMI trapping on read/write access to the 740 KB-768 KB memory region (where the text buffers are located).

When SMI trapping is available, the hardware generates an SMI on each read or write access. Using the trap address of the SMI trap, the exact text column and row may be calculated and the corresponding row and column in the virtual text screen accessed. Alternately, normal memory is enabled for this region and, using a periodic SMI, generic video SMM driver 130 scans for changes in the emulated hardware text buffer and updates the corresponding virtual text screen maintained by the video driver. In both cases, when a change is detected, the character is redrawn on the virtual text screen.

Mode Switching

Figure 7:
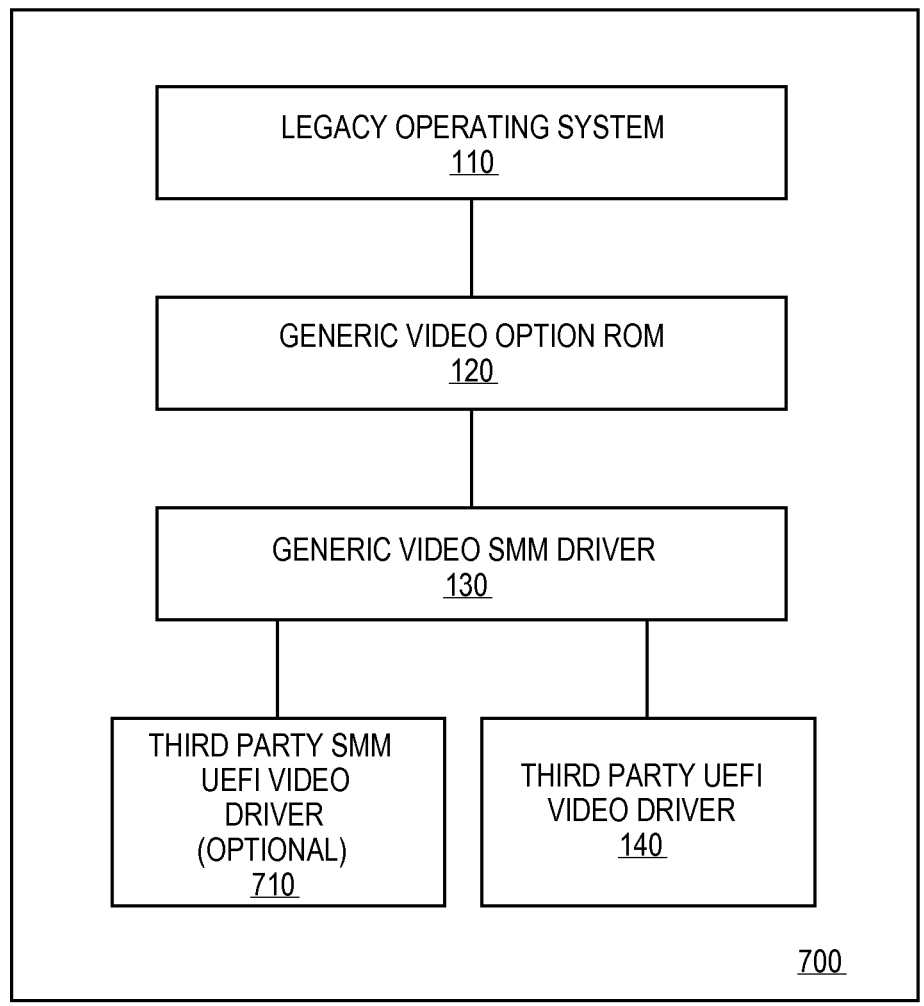
FIG. 7 is an illustration of an embodiment of the invention that includes an additional driver that provides additional instances of the EFI graphics output protocol and EFI simple text output protocol in the SMM execution environment.

Without additional software support, embodiments of the invention do not actually switch modes. Rather, embodiments emulate a mode switch by repositioning the virtual graphics device frame buffer in the graphics device frame buffer. In the embodiment depicted in FIG. 7, an additional driver 710 that provides additional instances of the EFI graphics output protocol and EFI simple text output protocol in the SMM execution environment may be used so that these additional modes can be handled directly. Specifically, the SetMode( ) member functions of these two protocols can be used to change the video mode and the Blt( ) function of the graphics output protocol can be used to speed performance.

The EFI simple text output protocol instance may be used to switch out of a graphics mode into one of the VGA text modes. In this way, direct access to the 704 KB-768 KB memory regions will directly affect the video output. In addition, emulation of these text modes is faster since the generic video option ROM 120 can handle most normal INT 0x10 functions, since it can now access the address space that contains the display for these modes.

An extension to the graphics output protocol instances in used to switch into one of the VGA graphics modes. In this way, direct access to the 640 KB-768 KB memory regions directly affect the video output. In addition, emulation of these VGA graphics modes is faster since generic video option ROM 120 can handle most normal INT 0x10 functions, since it can now access the address space that controls the display for these modes. Also, with an instance of the graphics output protocol, generic video SMM driver 130 can now use the Blt (pixel block copy) functions to increase execution speed using the hardware enhanced capabilities of the graphics device.

In this embodiment, with the extension driver 710 present, generic video SMM driver 710 handles primarily the mode switches, mode reporting, and the extended (non-VGA) graphics modes. The protocol instances are installed and discovered using a software service equivalent to the UEFI protocol services, such as InstallProtocolInterface and HandleProtocol.

Embodiments of the invention boot operating systems faster than prior approaches since the prior system's firmware may attempt booting a legacy operating system interleaved with attempts to boot a UEFI operating system. In doing so, it would have to repeatedly load and initialize the legacy option ROM and then the UEFI driver. By removing the switching back and forth, boot speed is enhanced. Also, since many of the operations are carried out in 32-bit or 64-bit protected mode, the CPU is able to execute at its full speed.

Embodiments of the invention also require less physical space to store because the system's firmware only requires a third party UEFI graphics driver to support all operating systems.

The term "machine-readable storage medium" as used herein refers to any medium that participates in storing instructions which may be provided to a processor for execution. Such a medium may take many forms, including but not limited to, non-volatile media and volatile media. Non-volatile media includes, for example, optical or magnetic disks. Volatile media includes dynamic memory, such as main memory. Non-limiting, illustrative examples of machine-readable media include, for example, a floppy disk, a flexible disk, hard disk, magnetic tape, or any other magnetic medium, a CD-ROM, any other optical medium, a RAM, a PROM, and EPROM, a FLASH-EPROM, any other memory chip or cartridge, or any other medium from which a computer can read.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A non-transitory machine-readable storage medium storing one or more sequences of instructions, which when executed, cause:
   upon an operating system requiring video services provided by firmware, the operating system communicating a request for video services to a generic video option ROM, wherein the operating system does not natively support the UEFI display protocols;
   the generic video option ROM notifying a generic video SMM driver of the request for video services;
   the generic video SMM driver notifying a third party UEFI video driver of the request for video services; and
   the third party UEFI video driver providing the requested video services to the operating system.

2. The non-transitory machine-readable storage medium of claim 1, wherein the generic video option ROM notifies the generic video SMM driver of the request for video services by issuing a system management interrupt (SMI).

3. The non-transitory machine-readable storage medium of claim 1, further comprising:
   prior to the operating system communicating the request for the video services, (a) initializing the generic video option ROM and (b) initializing the generic video SMM driver.

4. The non-transitory machine-readable storage medium of claim 3, wherein initializing the generic video SMM driver includes:
   locating instances of a graphics output protocol installed on a computer system upon which the operating system resides; and allocating a software system management interrupt (SMI) command-port value.

5. The non-transitory machine-readable storage medium of claim 3, wherein initializing the generic video option ROM includes:
   recording a software system management interrupt (SMI) command-port value;
   discovering attributes of graphics output devices; and
   updating a real-mode interrupt vector table.

6. The non-transitory machine-readable storage medium of claim 1, wherein the request for video services is a request to access a hardware text buffer.

7. The non-transitory machine-readable storage medium of claim 1, wherein the request for video services is a request to access a graphic device's frame buffer.

8. The non-transitory machine-readable storage medium of claim 1, further comprising:
   a third party SMM UEFI video driver changing a video mode in response to the request for video services, wherein the third party SMM UEFI video driver is not the third party UEFI video driver.

9. The non-transitory machine-readable storage medium of claim 1, wherein the generic video SMM driver determines a pixel that would have been updated in an emulated VGA mode and makes a corresponding update in a frame buffer for a graphic device.

10. The non-transitory machine-readable storage medium of claim 1, further comprising:
    periodically scanning for changes in a memory region that corresponds to a VGA graphics buffer to determine what changes should be made in a frame buffer of a graphic device.

11. A method for firmware to support legacy operating systems, comprising:
    upon an operating system requiring video services provided by the firmware, the operating system communicating a request for video services to a generic video option ROM, wherein the operating system does not natively support the UEFI display protocols;
    the generic video option ROM notifying a generic video SMM driver of the request for video services;
    the generic video SMM driver notifying a third party UEFI video driver of the request for video services; and
    the third party UEFI video driver providing the requested video services to the operating system.

12. The method of claim 11, wherein the generic video option ROM notifies the generic video SMM driver of the request for video services by issuing a system management interrupt (SMI).

13. The method of claim 11, further comprising:
    prior to the operating system communicating the request for the video services, (a) initializing the generic video option ROM and (b) initializing the generic video SMM driver.

14. The method of claim 13, wherein initializing the generic video SMM driver includes:
    locating instances of a graphics output protocol installed on a computer system upon which the operating system resides; and
    allocating a software system management interrupt (SMI) command-port value.

15. The method of claim 13, wherein initializing the generic video option ROM includes:
    recording a software system management interrupt (SMI) command-port value;
    discovering attributes of graphics output devices; and
    updating a real-mode interrupt vector table.

16. The method of claim 11, wherein the request for video services is a request to access a hardware text buffer.

17. The method of claim 11, wherein the request for video services is a request to access a graphic device's frame buffer.

18. The method of claim 11, further comprising:
    a third party SMM UEFI video driver changing a video mode in response to the request for video services, wherein the third party SMM UEFI video driver is not the third party UEFI video driver.

19. The method of claim 11, wherein the generic video SMM driver determines a pixel that would have been updated in an emulated VGA mode and makes a corresponding update in a frame buffer for a graphic device.

20. The method of claim 11, further comprising:
    periodically scanning for changes in a memory region that corresponds to a VGA graphics buffer to determine what changes should be made in a frame buffer of a graphic device.

21. A computer system, comprising:
    one or more processors; and
    a machine-readable storage medium storing one or more sequences of instructions, which when executed by the one or more processors, cause:
       upon an operating system requiring video services provided by firmware, the operating system communicating a request for video services to a generic video option ROM, wherein the operating system does not natively support the UEFI display protocols;
       the generic video option ROM notifying a generic video SMM driver of the request for video services;
       the generic video SMM driver notifying a third party UEFI video driver of the request for video services; and
       the third party UEFI video driver providing the requested video services to the operating system.

* * * * *